United States Patent [19]

Aurousseau et al.

[11] Patent Number: 4,476,675

[45] Date of Patent: Oct. 16, 1984

[54] ACCELERATION LIMITER FOR TURBOJET ENGINE

[75] Inventors: Christian Aurousseau, Dammarie les Lys; Pierre P. L. Odeyer, Paris, both of France

[73] Assignee: S.N.E.C.M.A., Paris, France

[21] Appl. No.: 355,662

[22] Filed: Mar. 8, 1982

[30] Foreign Application Priority Data

Mar. 6, 1981 [FR] France .................................. 81 04464

[51] Int. Cl.³ .............................................. F02C 9/28
[52] U.S. Cl. .................................................. 60/39.281
[58] Field of Search ........................... 60/39.281, 243; 137/568

[56] References Cited

U.S. PATENT DOCUMENTS 3,017,922 1/1962 Peterson et al. .
3,121,456 2/1964 McCathron et al. .
3,878,678 4/1975 Huellmantel et al. .
3,909,159 9/1975 Jansen et al. .................... 60/39.281

FOREIGN PATENT DOCUMENTS 918129 3/1949 France .
968718 10/1949 France .
1093476 12/1950 France .
1011263 6/1952 France .
1236941 6/1960 France .
2220674 9/1975 France .

Primary Examiner—Louis J. Casaregola
Attorney, Agent, or Firm—Oblon, Fisher, Spivak, McClelland & Maier

[57] ABSTRACT

An acceleration limiter is disclosed which includes a hydraulic accumulator (10) with a piston (10a), a spring, (10d) and a chamber 10b) for receiving the pressure Pi residing in the fuel supply circuit (3) from a point P1 in the supply circuit (3) located upstream from the injectors (2). Another chamber (10c) of the accumulator (10) is connected by a tube (11) to the outlet of the compressor (1a). This limiter makes it possible to absorb peaks in fuel flow resulting from sharp maneuvers on the throttle level with the same effectiveness despite variations in Pi, in particular with the altitude of the airplane.

1 Claim, 3 Drawing Figures

ACCELERATION LIMITER FOR TURBOJET ENGINE

BACKGROUND OF THE INVENTION

1. Field of the Invention

The present invention concerns an acceleration limiter for a turbojet intended to protect the turbojet from stalling of the compressor or overheating in the turbine.

2. Description of the Prior Art

It is known that the operating conditions of a turbojet, both in stable operation and during acceleration, are governed by the richness, which varies as the ratio C/P, of the flow of fuel C at a characteristic pressure P associated with the air flow passing through the combustion chamber, particularly the delivery pressure P2 of the compressor. In particular, the characteristic ratio C/P must not exceed a set maximum, in order to avoid the risk of the compressor stalling.

For this purpose, the regulator of the fuel flow sent to the injectors is generally equipped with a special device, known as an "acceleration stop," the function of which is illustrated in FIG. 1. This diagram represents the variations in the characteristic ratio C/P according to the rotation speed N of the turbine under various operating conditions. The curve S corresponds to the stable running of the turbojet, corresponding for example to a uniform cruising speed of the airplane on which it is mounted. The broken-line curve B corresponds to the upper limits imposed on the characteristic ratio C/P by the aforementioned acceleration stop. Because of this device, in the case of a sudden acceleration in the flow of fuel C due to a sharp action on the throttle lever, the operating point of the turbojet, starting for example from the stable operating point M, describes a curve such as a, having a rising side a1 that is more or less steep, followed by an arc a2 rising slowly and being slightly below the upper curve B.

However, in the particular case of a turbojet mounted on an airplane, it may occur that regulation of the flow has a characteristic such that, following a sharp action on the throttle level, it induces a flow such that the corresponding curve described by the operating point b has not only a rising side b1 but, before establishment of the arc b3 imposed by the acceleration stop, the operating point exceeds the maximum curve B with a more or less major amplitude b2. In the absence of special provisions, this would result in the compressor stalling or the turbine overheating.

To avoid such drawbacks, the prior art has used one or more hydraulic accumulators connected to the supply circuit of the fuel injectors, these accumulators having the effect of absorbing the excess fuel flow corresponding to the excess b2 on the diagram b in FIG. 1. This known disposition makes it possible to make an alteration in the operating point of the turbojet corresponding essentially to the diagram c in FIG. 2 correspond to a sudden acceleration in the fuel flow; with such an operating diagram, the operating point never passes beyond the maximum curve B imposed by the acceleration stop (both parts c1 and c3 of the curve being connected by a horizontal part c2 which, with the corresponding part of the curve a (FIG. 1), describes an area A essentially proportional to the internal volume of the hydraulic accumulator).

The use of an ordinary hydraulic accumulator with piston and spring is, however, not entirely satisfactory, for the following reason: the axial position x of its piston, with a surface S', is connected to the injection pressure of the fuel Pi that acts on one face of said piston, as well as to the tenseness k of the spring and to the environmental pressure Po, which act on its other face, in the relationship:

$$Pi = \frac{k \cdot x}{S'} + Po. \qquad (1)$$

However, since the size of the accumulator's cylinder limits the maximum possible variation $\Delta x$ in the position of its piston, the accumulator is only usable within the following limits on variation of the injection pressure:

$$\Delta Pi = \frac{k}{S'} \Delta x. \qquad (2)$$

It follows that the mechanical and size constraints imposed on the realization of such an accumulator make its range of utilization $\Delta Pi$ noticeably inferior to the range of necessary variations in the injection pressure Pi, particularly in the case of airplanes able to fly at high altitude.

Other applications of hydraulic accumulators in fuel supply circuits for turbojets are also known and include:

The French Pat. No. 968 718 by ROLLS ROYCE LTD. describes a supply and start device for a gas turbine having an accumulator with piston and spring in which a first chamber is filled with fuel by the supply circuit of the injectors when the turbine is operating steadily. Upon start-up, the gas is under pressure produced by a cartridge push back, in particular, a liquid that fills the second chamber of the accumulator so as to supply the injectors adequately.

The French Pat. No. 1 236 941 by Bristol Siddeley Engines also describes a system to supply fuel to a gas turbine, with a hydraulic accumulator, linked, in particular, to the supply circuit of the post-combustion burners in this turbine.

SUMMARY OF THE INVENTION

Accordingly, one object of this invention is to provide a novel acceleration limiter for turbojets which, as in the prior art, includes at least one hydraulic accumulator connected to the supply circuit of the fuel injectors, but which is constructed in such a way that the accumulator is able to absorb any possible acceleration peaks in the fuel flow within a much expanded range of injection pressure in relation to that which can be covered by the ordinary hydraulic accumulators mentioned above, particularly so as to preserve the effectiveness of the acceleration limiter at whatever altitudes the airplane equipped with the turbojet might reach.

The acceleration limiter for turbojets according to the present invention is characterized by the fact that the piston of the hydraulic accumulator divides its cylinder into a first chamber connected to a point in the supply circuit of the injectors, located upstream from the latter, and by the fact that elastic means act on the accumulator's piston in the direction tending to reduce the volume of its first chamber.

If the pressure at the outlet of the turbojet's compressor is designated by P2, it is possible to show that the relationship (1) indicated above is replaced by $$Pi = \frac{k \cdot x}{S'} + P2 \qquad (3)$$

and that, subsequently, the relationship (2) becomes $$\Delta Pi = \frac{k \cdot \Delta x}{S'} + \Delta P2 \qquad (4)$$

In this latter relationship, $\Delta P2$ designates the variation in the compressor's back pressure as a function in particular of the altitude, P2 diminishing when the altitude increases. As it results from the preceding definitions that $\Delta x$ and $\Delta P2$ are positive values, it can be seen that the acceleration limiter according to the present invention makes it possible to increase, in particular by $\Delta P2$, the range of injection pressures $\Delta Pi$ that can be covered with a given hydraulic accumulator, the size of which determines the values k, $\Delta x$ and S'. Conversely, the present invention makes it possible to cover a given range of variation in the injection pressure of the fuel $\Delta Pi$ by using a hydraulic accumulator that is undersized in relation to the ordinary accumulator which would be necessary to cover the same range $\Delta Pi$.

In a preferred form of realization of the acceleration limiter according to the present invention, a diaphragm, preferably adjustable upon acceptance, is inserted between the accumulator's second chamber and the compressor's outlet. This arrangement offers the advantage of introducing a supplemental rigidity, in particular adjustable upon acceptance, added to that of the spring during rapid movement of the accumulator's piston. Adjustment upon acceptance of this diaphragm makes it possible to adjust the transient value of the coefficient k in the preceding formula (4) in order to adapt it to the range of injection pressures $\Delta Pi$ that must be covered.

In order to prevent the small amounts of fuel that might pass from the accumulator's first chamber into its second chamber, should the tightness of its piston be less than perfect, from being able to reach the compressor, the present invention provides for the following dispositions, preferably in combination with one another:

(a) a check-valve is inserted between the accumulator's second chamber and the compressor's outlet;

(b) the tubing connecting the accumulator's second chamber to the compressor's outlet includes, at a point located upstream from the check-valve, an off-take that communicates with the atmosphere through a diaphragm, so that small fuel leaks can be drained off and ejected into the atmosphere through this diaphragm, and which allows the pressure in the accumulator's second chamber to be equal to the compressor's back pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
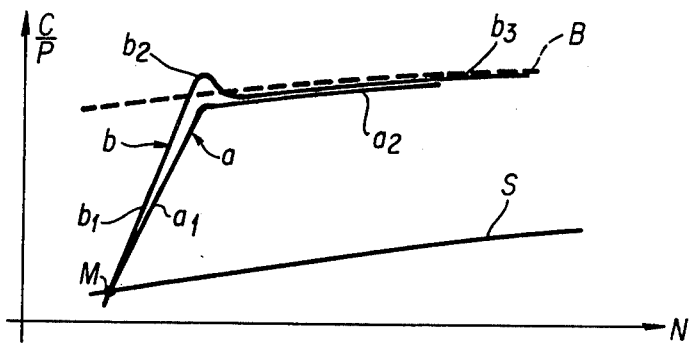
FIGS. 1 and 2 illustrate characteristic speed curves of a turbojet and, in particular, acceleration.
Figure 2:
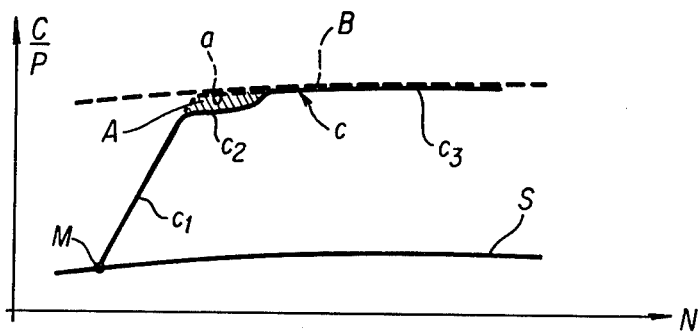
Figure 3:
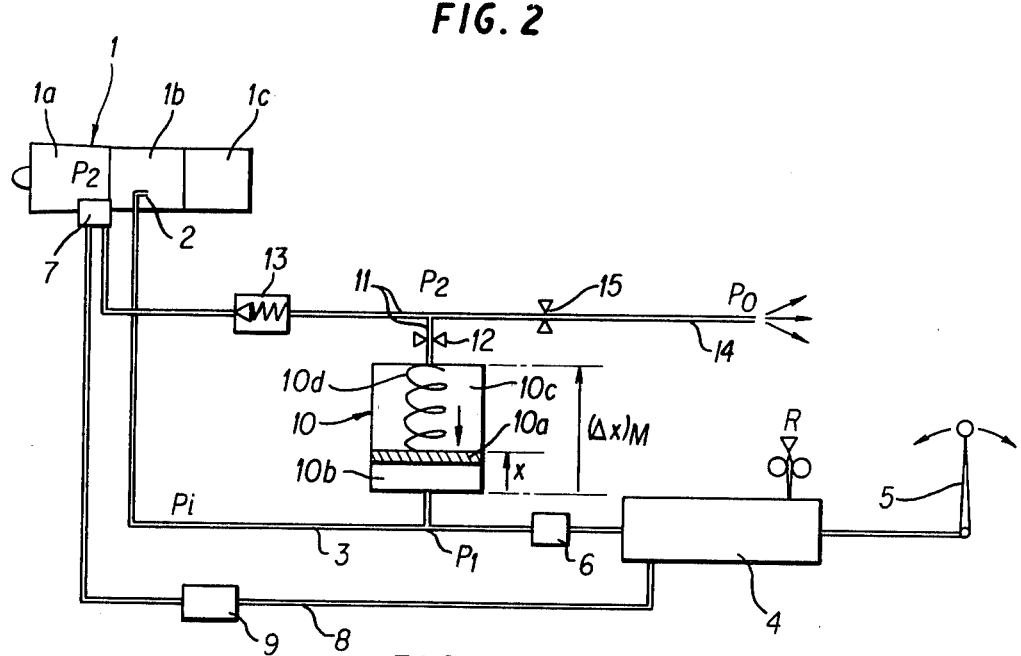
FIG. 3 is a diagram of the referred embodiment of an improved acceleration limiter.

Referring now to the drawings, wherein like reference numerals designate identical or corresponding parts throughout the several views, and more particularly to FIG. 3 thereof, a turbojet has been shown at 1, in which the compressor has been designated by 1a, the combustion chamber or chambers by 1b, and the turbine by 1c. In the combustion chamber 1b are arranged injectors such as 2, which are supplied with fuel through the following circuit: the fuel coming from a tank R is sent towards the injectors such as 2 through at least one tube 3 into which are inserted, first of all, a regulator 4 of a known type controlled by a throttle lever 5, and, upstream from the injectors such as 2, a distributor-air cock 6. At the compressor's outlet, having a pressure P2, is placed an air intake, which issues into a filter 7. A first tube 8 connects the outlet of this filter 7 to an intake in the regulator 4, passing through a stop corrector 9 of a known type. It is this latter device in association with the regulator 4 which assures the function of acceleration stopping which corresponds to the broken-line curves B on the diagrams in FIGS. 1 and 2. These devices being known and not comprising part of the invention, they are not described in detail.

The system according to the present invention includes a hydraulic accumulator 10, the piston 10a of which divides the cylinder into a first chamber 10b connected to a point p1 in the supply tubing 3 of the injectors such as 2, and in particular, in the example of realization in question, between the outlet of the distributor-air cock 6 and the pipe of the injectors such as 2, and into a second chamber 10c connected in the following manner to the compressor's outlet. A connecting pipe 11 leaves the chamber 10c of the hydraulic accumulator 10, ending in a second outlet of the filter 7. Into this pipe 11 there are inserted, first, in the immediate proximity of the hydraulic accumulator, a first adjustable diaphragm 12, and then, between this diaphragm 12 and the filter 7, a checkvalve 13 which is mounted so as to allow the passage of air at a pressure P2, coming from the compressor's outlet in the direction of the chamber 10c of the accumulator 10. In addition, in the form of realization in question, one point p2 of the pipe 11, which is located between the adjustable diaphragm 12 and the check-valve 13, is connected by a tube 14 to the environmental pressure Po, in a blow-off box, for example. Furthermore, a diaphragm 15, which may be adjustable, is inserted into the second chamber 10c of the hydraulic accumulator 10 so as to act on its piston 10a in the direction tending to reduce the volume of its first chamber 10b, i.e., in the descending direction indicated by an arrow in FIG. 3.

The mode of operation of this acceleration limiter according to the present invention is as follows.

During stabilized operation of the turbojet 1, the piston 10a of the hydraulic accumulator 10 occupies a fixed position in the accumulator's cylinder. This position of the piston 10a corresponds to a balance in the forces exerted on its lower face which consists of the pressure Pi of the fuel circulating in the tube 3 in the direction of the injectors such as 2, and, the pressure on its upper face, which consist of the pressure at the outlet of the compressor P2 transmitted in the second chamber 10c of the accumulator 10 through the components 7-13-11-12, as well as the tenseness k spring 10d. This position of balance x of the piston 10a of the accumulator 10 is defined by the relationship (3) which was given previously. If a sharp action of great amplitude is exerted on the throttle lever 5 in the direction tending to increase the fuel flow that the regulator 4 sends into the supply pipe 3 in order to accelerate the jet, this results in a major increase in the pressure Pi of the fuel in the pipe 3 and in the first chamber 10$b$ of the accumulator 10. As the increase in the pressure P2 at the outlet of the compressor 1$a$, the relationship (3) above, put in the form (4) for example, shows that x increases, i.e., that the piston 10$a$ rises to a new balance position, but that the increase $\Delta$x corresponding to the increase $\Delta$Pi in the pressure of the fuel is lower than if the pressure P2 were not transmitted to the second chamber 10$c$ of the accumulator.

It can be easily seen that, in the case of the hydraulic accumulator according to the present invention, $\Delta$x is proportional to ($\Delta$Pi−$\Delta$P2). Consequently, not only does the hydraulic accumulator of the acceleration limiter according to the present invention prevent the operating point of the turbojet from exceeding the acceleration stop B, as has been previously explained with the aid of the diagrams in FIGS. 1 and 2, but in addition, for a given size of this hydraulic accumulator corresponding to the chosen values of the constants k, S and ($\Delta$x)$_M$, the accumulator can effectively act as indicated for a greater range of variation in the pressure Pi of the fuel, as shown by the relationship (4), since Pi and P2 vary in the same direction, i.e., both diminishing with the altitude. In the relationships (3) and (4), the coefficient k designates the total tension resulting from that of the spring 10$d$ and from throttling of the air at the pressure P2 by the diaphragm 12 upon displacement of the piston 10$a$. This latter component of the tension k being adjustable upon acceptance by means of the diaphragm 12 itself. The diaphragm makes it possible to adapt the operating conditions of the acceleration limiter acording to the present invention to the actual conditions of the use of the turbojet 1, and, in particular to the roof of the airplane on which it is mounted.

If some fuel should get around the joint, with which the piston 10$a$ of the accumulator 10 is equipped, and penetrate its second chamber 10$c$, the check-valve 13 would prevent the fuel from being pushed back towards the outlet of the compressor through the filter 7. Fuel leaks can then be diverted towards the atmosphere through the components 12-11-15-14. The role of the diaphragm 15 is obviously to keep the tube 11 and the second chamber 10$c$ of the hydraulic accumulator 10 from reaching atmospheric pressure.

The present invention is not limited to the form of realization described previously. It encompasses all variants. The means provided to prevent the back-flow of fuel leaks from the hydraulic accumulator towards the outlet of the compressor, and to evacuate these leaks, are optional. This is also true for the adjustable diaphragm 12, which may be eliminated. The spring 10$d$, acting on the piston 10$a$ of the accumulator 10, in the direction tending to reduce the volume of its first chamber 10$b$ , can be replaced by equivalent elastic means. In fact, the hydraulic accumulator 10 with its piston 10$a$ can be replaced by any other equivalent hydraulic accumulator of a known type. Several accumulators can be connected in parallel, in particular in parallel between the tubes 3 and 11 in FIG. 3. Finally, the acceleration limiter according to the present invention may be associated with a turbojet supply circuit of any type, possibly different from that illustrated in FIG. 3 and described previously.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An acceleration limiter for turbojets, having at least one hydraulic accumulator connected to the supply circuit of the fuel injectors, said accumulator comprising:

a piston which divides the cylinder of said accumulator into a first chamber which is connected to a point in said supply circuit of said injectors said point being located just upstream from said injectors and a second chamber connected to the outlet of the compressor of said turbojet by a tube which includes an adjustable diaphragm, an elastic means acting on said piston in a direction tending to reduce the volume of said first chamber, and a check-valve inserted between said second chamber of said accumulator and the outlet of said compressor wherein said tube connecting said second chamber of said accumulator to the outlet of said compressor has at a point located between said check-valve and said adjustable diaphragm an off-take which communicates with the atmosphere through a second diaphragm.

* * * * *